May 10, 1938.    W. E. VECSEY    2,116,937
TIRE CORD
Filed Dec. 11, 1935

INVENTOR
William E. Vecsey
BY  Evans & McCoy
ATTORNEYS

Patented May 10, 1938

2,116,937

UNITED STATES PATENT OFFICE 2,116,937

TIRE CORD

William E. Vecsey, Akron, Ohio, assignor to General Tire & Rubber Company, Akron, Ohio, a corporation of Ohio Application December 11, 1935, Serial No. 53,926

4 Claims. (Cl. 117—52)

This invention relates to hawser twisted threads or cords of the type used as the strain-resisting elements in pneumatic tires and to pneumatic tires embodying such cords.

Tire casings are subjected to severe stresses from road impacts, violent starting, turning at high speed, and stopping. When tire casings are ruptured the stresses are localized in the cords adjacent the rupture and many times blowouts occur with fatal results. For these reasons high strength in cords for use in pneumatic tires is extremely desirable. Tire casings are also subjected to continued flexing during operation, and the cord used for tire casings must be capable of withstanding this continued flexing without premature deterioration.

Heretofore hawser twisted cord has been used extensively in which the yarn and ply elements of the cord were twisted more than necessary for the development of maximum strength. Such cords are usually of balanced construction, which requires a correspondingly high final or hawser twist, although some manufacturers have used successfully underbalanced and overbalanced constructions. This resulted in a great increase in the fatigue-resisting properties of the cord with a sacrifice of strength. The resulting cord has also the very undesirable property of excessive elongation or attenuation under the continued stress from inflation pressures and operating conditions. The use of such cord in truck and other tires results in the enlargement or growth of the tire with use and many times this causes cracks to form in the grooves in the tread rubber, apparently because the enlargement of the tread rubber becomes more localized in the tread grooves, where the body of rubber is thinnest, than in other parts of the tread, and the rubber at the bottom of the tread grooves does not stretch sufficiently to compensate for the elongation of the cords in the carcass of the tire. Many other objectionable and harmful results are produced by the growth of tire casings in use.

The primary object of this invention is to provide a hawser or "twist on twist" cord having tensile strength as great or greater than the cords heretofore known, with low attenuation or elongation, high elasticity and high fatigue-resisting properties, as compared with commercially used high twisted cords, thus combining all of the major advantages of both the low twisted and the high twist cord, without the objectionable disadvantages of either, so far as the use of such cords in tires and the like is concerned, and generally with higher fatigue resisting properties than found in previously used high twisted cord.

The cord of the present invention, by reason of its high tensile strength, its high fatigue-resisting qualities, its high degree of elasticity, and relatively low elongation, is a superior cord for pneumatic tire casings of all types, but is particularly useful in high pressure, heavy duty tires, such as truck and bus tires, since it gives the casing the necessary strength and stretch-resisting qualities to minimize blowouts and minimize growth of the tire casing from elongation of the cord elements, and at the same time it increases the life of the tire casing by the ability of the cords to resist fatigue from continued flexing.

In the accompanying drawing.

Figure 1:
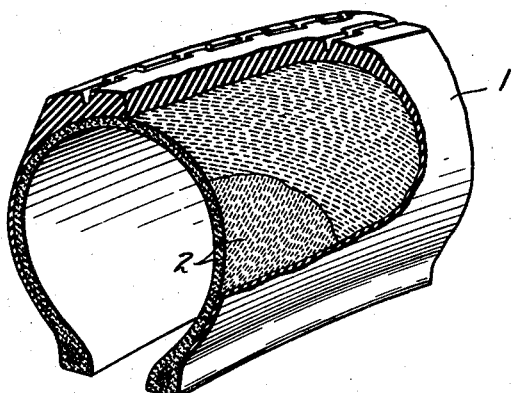
Figure 1 is a fragmentary perspective view showing a portion of a pneumatic cord tire embodying cord elements made in accordance with this invention.
Figure 2:
Fig. 2 is an enlarged fragmentary sectional view of rubberized cord fabric embodying the invention.

In the drawing, the tire indicated by the numeral 1 is reinforced by superposed layers of parallel cords 2 embedded in the tire wall and extending diagonally. The cords 2 may be unconnected or held in spaced relation by interwoven cross threads. In either case the cords are usually embedded between covering sheets of rubber to form a rubberized sheet 3 prior to the tire building operation.

Figure 3:
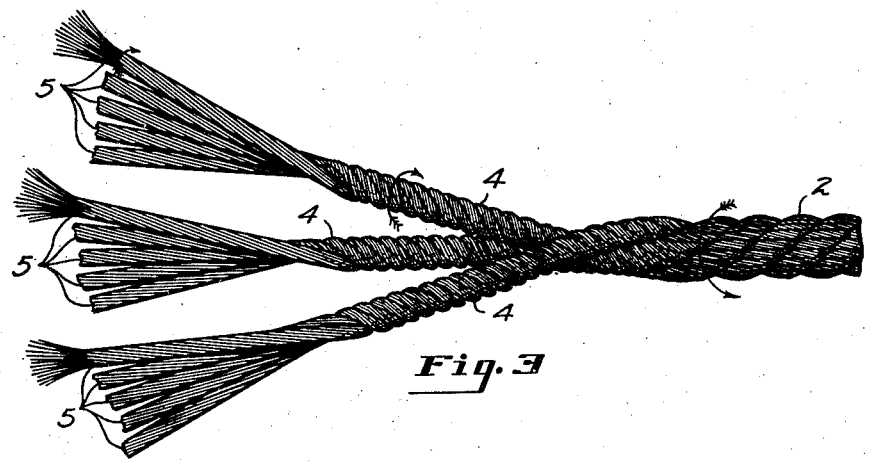
Fig. 3 is an enlarged view diagrammatically showing a hawser cord embodying the present invention with arrows applied thereto showing the direction of twist of the elements of the cord.

The cord 2, as shown diagrammatically in Fig. 3, is made up of ply strands 4 that are twisted together to form the cord. Each of the ply strands is made up of a series of yarn strands 5. Each of the yarn strands 5 has the least twist necessary to maintain uniform section and fiber arrangement which is three or less times the square root of the number of the yarn. This forms a very soft yarn. The ply strands 4 have a very high twist in the same direction as the yarn strands. The ply twist is more than 9.75 and less than twelve times the square root of the number of the plied yarn. To complete the cord the ply strands are twisted together in the direction opposite that of the yarn and ply twists but of only sufficient final or hawser twist to obtain substantial balance for the completed cord.

As the number of turns per inch in the yarn is reduced, the number of turns per inch in the ply should be increased, until maximum tensile strength is obtained in the finished cord.

The cord of the present invention is produced by the same machinery that has been employed heretofore in the production of pneumatic tire cord. The method of producing the cord of the present invention, however, differs from the methods heretofore employed in that the single yarn is given as low a twist as can be given to it in commercial manufacture in the spinning process to produce a yarn or yarn element sufficiently uniform in size, strength and fiber arrangement for the plying process. This is found to be three or less times the square root of the yarn number. It is essential to give the yarn some twist in the spinning process in order to maintain substantial uniformity throughout the length of the yarn as it is being spun and elongated to properly arrange the fibers of the yarn and make it possible to give the yarn the very high degree of ply twist that is essential to the invention. Several strands of this low twist yarn are twisted together in the same direction as the single yarn twist, but with such high twist that the strength of the ply elements, when tested before the ply elements are twisted together, is well beyond the ply twist necessary for maximum strength. The ply twist necessary to obtain substantially maximum tensile strength for a substantially balanced hawser cord of the construction here given is generally 9.75 to twelve times the square root of the number of the twisted ply. If the yarn twist is to the right, the ply twist must be also to the right. If the yarn twist is to the left, the ply twist must be also to the left. With this exceptionally low twist single yarn it is possible to use a much higher ply twist with no sacrifice in tensile strength in the finished cord, and in this manner high fatigue-resisting qualities are obtained. In fact, the tensile strength of the cord is generally increased over what was previously considered to be the maximum for a given size considered to be the maximum for a given size of cord of a given cotton. A number of plies of the character specified are then twisted together in the opposite direction to form the completed hawser cord. The final or hawser twist, which is opposite to the yarn and ply twists, is preferably a minimum and just sufficient to balance the cord, although underbalanced or overbalanced final twists may be used if desired.

It is to be understood that the amount of twist in the yarn may vary considerably, but must always be three or less times the square root of the yarn number. For example, one length of staple cotton requires less single yarn twist for the same unit weight, to maintain uniformity than other lengths of staple. As a general rule it may be stated that, as the length of the staple increases the turns per inch of twist in the single yarn may be reduced, more turns per inch of twist being required for shorter staple cotton than for a long staple cotton, as is well known to those skilled in the art. With all fibers, however, it is desirable to give the yarn the minimum number of turns per inch of spinning twist that is necessary to proper arrangement of the fiber and maintenance of uniform cross-section of the yarn while it is twisted into the ply to avoid weak spots in the resulting cord. By reason of the low twist of the single yarn, it is very soft and when such yarn is twisted to form a highly twisted ply the single yarn strands pack closely together and give a more uniform distribution of fibers throughout the cross-section of the cord and more evenly distribute the load and bending stresses between the individual fibers. This may account for the superior tensile strength and the elasticity possessed by the hawser cord of the present invention. The turns per inch of twist in the ply preferably should be increased with any reduction in the turns per inch of twist in the single yarn to obtain maximum tensile strength and the increased resistance to fatigue in the finished cord. The final or hawser twist is determined by the minimum number of turns necessary to obtain a substantially balanced construction, although overbalanced or underbalanced constructions may be obtained by increasing or decreasing the final twist to the degree desired. As a general rule, the yarn twist must be three or less times the square root of the number of the yarn, and the ply twist must be 9.75 or more times the square root of the number of the ply to obtain the advantages of the invention.

High twist cord for tires is conventionally constructed with 21 to 23 turns per inch of twist in a single 23's yarn, 20.5 to 22.5 turns per inch of twist in the 23's/5 ply, and 9.5 to 10.5 turns per inch of final or last twist in the 23's/5/3 hawser cord. This type of cord has relatively low tensile strength and high elongation, but relatively good fatigue-resisting properties. Cords of the high twist type for obtaining fatigue-resisting qualities, as heretofore constructed, have sacrificed as much as 10% in tensile strength to gain resistance to fatigue.

The cord of the present invention obtains greater resistance to fatigue without any sacrifice in tensile strength and many times with improvements in strength. A 22½'s/5/3 hawser cord embodying the present invention is produced by employing 14¼ or less turns per inch of twist in the single 22½'s yarn, 21 or more turns per inch of twist in the 22½'s ply, and sufficient turns of twist in the 22½'s/5/3 hawser to balance the cord, which is generally about 8 turns per inch. The final hawser twist should be the minimum to provide a substantially balanced construction. The foregoing twists, when used with $1\tfrac{5}{32}$ inch staple American middling cotton, give a substantially balanced cord that has a gauge of about .034, an average ultimate tensile strength at 6.5% moisture regain of 21.2 pounds when tested on a standard Scott tester, an average elongation of 12.56% under a ten pound load applied to the cord when its moisture regain is 6.5%, and an ultimate elongation of 17.59% under like conditioning of the cord when tested on a standard Scott tester. Comparative tests of pneumatic tires containing such cord show greatly reduced growth of the tire, greatly increased resistance to blow-out, and greatly increased mileage for such tires, as compared with tires made the same, except as to the cord element. Such cord has been used with remarkable success in both truck and passenger automobile tires.

As a further illustration of the application of the principles of this invention, a hawser cord for pneumatic tires made from the same cotton as above but employing a yarn twist of 13¾ turns per inch, a ply twist of 22 turns per inch, and a final or hawser twist of 8 turns per inch, will give an ultimate average strength of 21.5 pounds when tested as specified above and an average elongation at ten pound load of 12½% when tested as above. The ultimate elongation will be substantially the same as in the previous example.

The fatigue-resisting properties of each of the above specified cords are even greater than the fatigue-resisting properties of cord in which a high degree of twist is used in the yarn, ply, and final hawser twist, with greatly increased strength.

The twists that are referred to here, both in the specification and the claims, are the twists that are determined from taking a fixed length of finished cord, unwinding that cord to determine the number of turns per inch relative to the original length of the cord for the hawser or final twist, removing all but one of the ply units and untwisting that ply unit to determine the number of turns per inch in the ply unit relative to the original length of cord, then removing a fixed length of the yarn from the untwisted ply and determining the number of turns per inch in that length of yarn by again untwisting it without regard to contraction and expansion. Each twist, with the exception of the yarn twist, is determined with respect to the original length of the finished cord taken for the test, and the twist per inch in the yarn is determined by the number of turns relative to the original length of the yarn specimen untwisted. The twists are determined in this manner in order to provide a method of determining these factors in the finished cord. These twists are taken under the standard conditions of 6½% moisture regain, as well understood by those skilled in the art.

From these things it will be seen that this type of cord has the very important advantages of high tensile strength, relatively low elongation, high elasticity, and very high fatigue-resisting properties. This improvement is not limited to any particular cotton or fiber or to yarns of any particular size, the principle is equally applicable to yarns ranging from 5's to 30's and others, and it is not limited to a five ply or a three ply unit construction. Two, as well as five-ply unit constructions have been employed with success. The 23's/5/3 and the 22½'s/5/3 cords are illustrative only, and exemplify the cord constructions now in most general use for pneumatic tire casings. If cord of other constructions is desired, the yarn is first twisted the minimum amount necessary to produce uniformity and proper arrangement of fiber, and given a twist three or less times the square root of the yarn number. The ply twist is then increased beyond nine times the square root of the plied yarn number, until maximum strength is obtained in the finished cord, using a minimum balancing hawser twist. If ultimate strength is of less importance than fatigue resistance, then the ply twist may be substantially increased beyond the twist that gives maximum tensile strength in the finished cord. Any desired degree of underbalance for the finished cord may be obtained by changing the final or hawser twist.

What I claim is:

1. In a pneumatic tire, a reinforcing hawser cord fabric in which the cords have a yarn twist for each inch of yarn of three or less times the square root of the yarn number, which twist is not substantially more than that required to bind the fibers together in a uniform strand, a ply twist in the same direction as the yarn twist and with a number of turns greater than 9.75 times the square root of the number of the plied yarn, whereby increased elasticity, increased fatigue resistance, and high tensile strength are obtained, and assembled ply units twisted together in a direction opposite to the direction of twist of the yarn and ply elements.

2. A hawser cord for use in pneumatic tires having a yarn twist for each inch of yarn of three or less times the square root of the yarn number, which twist is not substantially more than that required to bind the fibers together in a uniform strand, a ply twist in the same direction as the yarn twist and of more turns per inch than 9.75 and less turns per inch than twelve times the square root of the number of the plied yarn, whereby increased elasticity, increased fatigue resistance, and high tensile strength are obtained, and a final twist of assembled ply units in a direction opposite to the yarn and ply twist and of a minimum number of turns necessary to substantially balance the resulting hawser cord.

3. A 22½'s/5/3 hawser cord for use in pneumatic tires having a 22½'s yarn twist of fourteen and one-fourth or less turns per inch, which twist is not substantially more than that required to bind the fibers together in a uniform strand, a 22½'s/5 ply twist of twenty-one or more turns per inch in the same direction as the yarn twist, whereby increased elasticity, increased fatigue resistance, and high tensile strength are obtained, and a final 22½'s/5/3 twist of a minimum number of turns necessary to substantially balance the finished cord.

4. A hawser cord for use in pneumatic tires comprising a plurality of ply strands, each composed of a plurality of yarn strands, the twist per inch in the yarn strands being only sufficient to obtain uniformity of size of the yarn and substantially uniform fiber arrangement and being three or less times the square root of the yarn number, the ply strands being twisted in the same direction as the yarn strands with the number of turns per inch in the ply being more than 9.75 and less than twelve times the square root of the number of the plied yarn, whereby increased elasticity, increased fatigue resistance, and high tensile strength are obtained, and a plurality of ply strands twisted together in the direction opposite the twist of the yarn and ply strands to complete the cord and with the number of turns per inch in the last twist being no more than necessary to produce a substantially balanced cord.

WILLIAM E. VECSEY.